Figure 1:
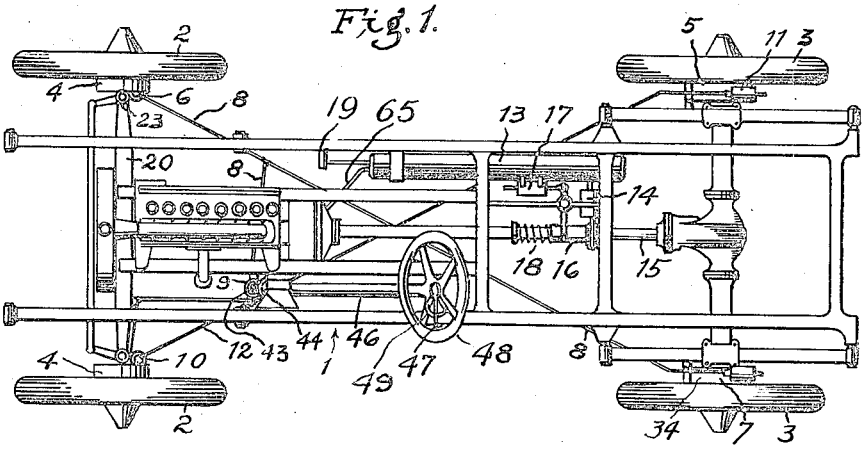

J. R. OSTOLAZA.
MOTOR VEHICLE AIR BRAKE.
APPLICATION FILED OCT. 28, 1916.

1,320,906.

Patented Nov. 4, 1919.
2 SHEETS—SHEET 1.

Inventor:
Justo Rivas Ostolaza.

By James W. Masters
His Attorney.

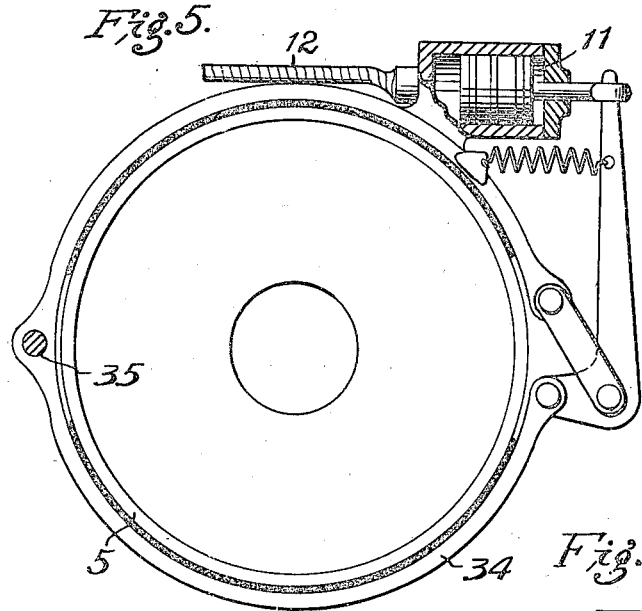
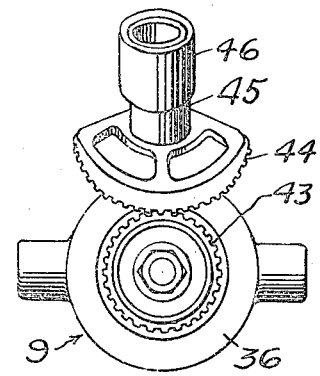
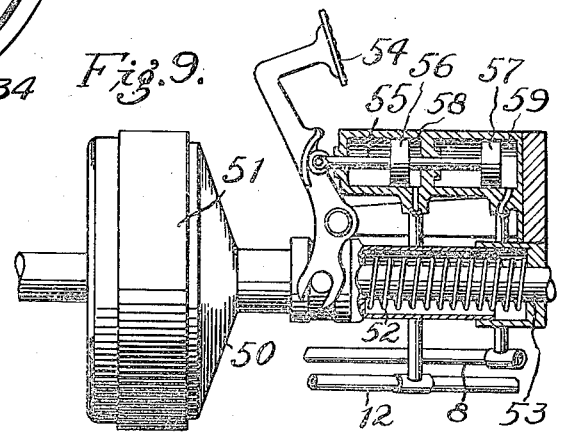
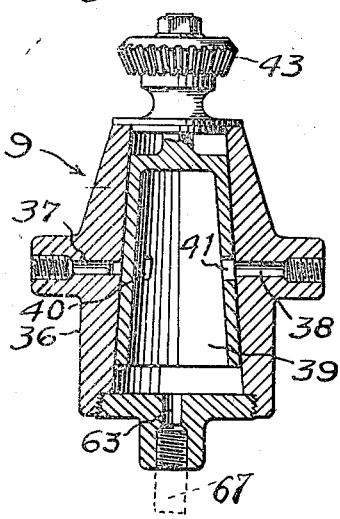
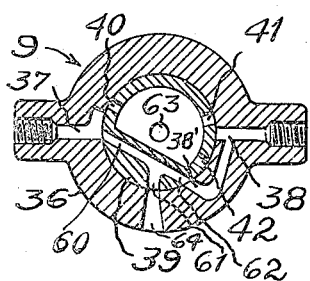

UNITED STATES PATENT OFFICE.

JUSTO RIVAS OSTOLAZA, OF LOS ANGELES, CALIFORNIA.

MOTOR-VEHICLE AIR-BRAKE.

1,320,906.

Specification of Letters Patent.

Patented Nov. 4, 1919.

Application filed October 28, 1916. Serial No. 128,251.

*To all whom it may concern:*

Be it known that I, JUSTO RIVAS OSTOLAZA, a subject of the King of Spain, residing at Los Angeles, in the county of Los Angeles and State of California, have invented new and useful Improvements in Motor-Vehicle Air-Brakes, of which the following is a specification.

My invention relates to air brakes for vehicles and particularly to self-propelled vehicles, the invention being applicable to motor-cycles, traction-cars, and automobiles.

The object of the invention is to simplify the structure as well as the means and mode of applying brakes to a car or automobile, whereby they will be more efficient in use, positive and automatic in their action, and unlikely to get out of repair.

Another object of this invention is to provide means for applying brakes to the car effective upon both the front and rear axles, whereby the stress and strains on the car are more evenly distributed as the car is brought under control or stopped.

When a brake is applied, the car as a whole tries to turn around upon the axle; so applying a rear wheel brake puts a torque on the car frame which is resisted by the pressure of the front wheels on the ground. If the adhesion of the rear wheels is insufficient, so that one of them locks, that wheel is useless for steering, and if the second locks, the whole axle cannot be steered.

With front wheel brakes the tendency of the application is to lift the whole car, so throwing more weight on the front axle and pressing the wheels harder against the ground and increasing the adhesion, but, if front wheel brakes should be applied with sufficient force to lock the wheels, all steering power is lost.

To avoid these objections, I have arranged to link the brakes diagonally; to have a brake on each wheel with the right-hand front interconnected and simultaneously operative with the left-hand rear, and the right rear with the left front. With this arrangement, and with whatever force the brake may be applied to either axle, there will always be one or more wheels that are rolling free and able to control the course of the car.

Another object of this invention is to provide an efficient emergency brake. This is accomplished by having a control within easy reach of the operator whereby the brakes may be applied to all wheels at once.

With the above primary and other incidental objects in view as will more fully appear in the specification, the invention consists in the features of construction, the parts and combinations thereof, and the mode of operation or their equivalents, as hereinafter described and set forth in the claims.

While simple and efficient means are herein provided for accomplishing the objects of the invention and the elements shown and described are well adapted to serve the purposes for which they are intended, it is to be understood that the invention is not limited to the precise construction shown in the drawings, but may vary in accordance with what is claimed.

Figure 2:
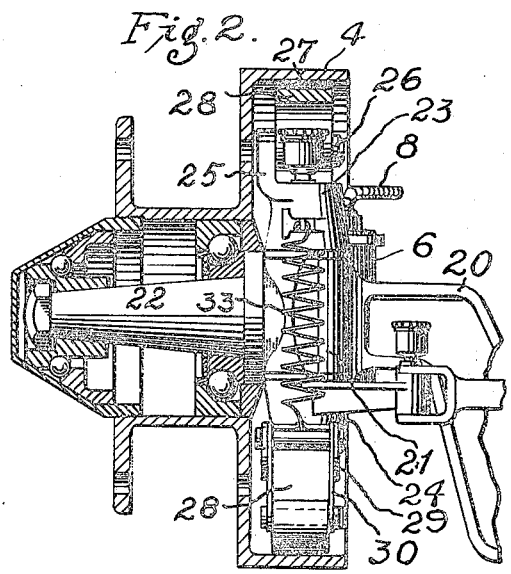
Figure 3:
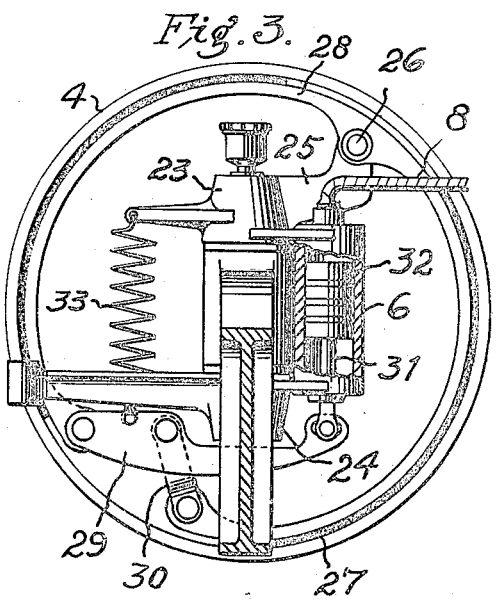
Figure 4:
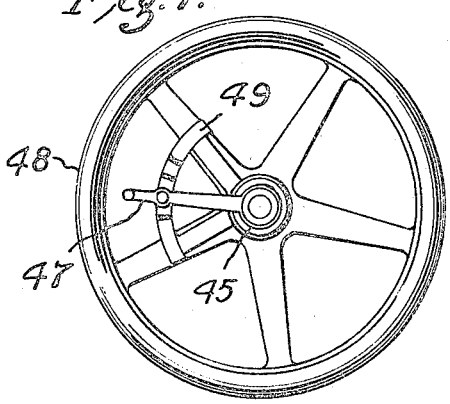

In the drawings, Figure 1 is a plan of an automobile chassis having my invention applied thereto. Fig. 2 is a sectional elevation of a front axle and front wheel hub with brake drum and internal brake attached. Fig. 3 is a side elevation of the wheel and hub shown in Fig. 2. Fig. 4 is a plan of the top of the steering wheel showing the control lever. Fig. 5 is a side elevation of a rear wheel hub with drum and external brake attached thereto. Fig. 6 is a plan of the brake valve. Fig. 7 is a vertical mid-section of the brake valve. Fig. 8 is a horizontal mid-section of the brake valve. Fig. 9 is a detail of the automatic clutch release.

Referring to the drawings, the automobile chassis 1 has mounted thereon the front wheels 2, and rear wheels 3. Front wheels 2 are provided with brake drums 4, and the rear wheels with brake drums 5. The front brake cylinder 6 and rear brake cylinder 7 are connected by air pipe 8 with the valve 9, and similarly brake cylinder 10 and cylinder 11, on diagonally opposite wheels are connected by air pipe 12 with valve 9. A main air tank 13 is supplied with air pressure by air pump 14. The air pump is driven by the engine shaft 15, there being a clutch 16, normally held in disengaged position by the pressure regulating valve 17. When the pressure in the main air tank falls below a predetermined pressure, the clutch is shifted to operative position, and the air pump is operated upon rotation of the engine shaft. When the pressure reaches a certain amount on the main air tank, the clutch is disengaged by the spring 18. From the foregoing it may be seen the supply of air pressure may be kept automatically at the normal amount.

A pressure gage 19 shows the amount of air pressure in the main tank.

The internal brake as applied on the front wheel brake drums is shown in Fig. 2. In this case the vehicle axle 20 is provided with a knuckle 21, and the wheel axle 22 with knuckles 23, 24, the two axles being swiveled in the usual manner. The knuckle 23 carries a bracket 25, to which the brake band is pivoted on the pin 26. The brake band is faced with a friction fabric 27. The brake band 28 is expanded by the toggle lever 29 and links 30. The lever 29 is actuated by piston rod 31 and piston 32 within brake cylinder 6. When air pressure is removed from cylinder 6, the spring 33 retracts lever 29 and releases the brake.

The external brake shown applied to the rear wheel brake drums in Figs. 1 and 5 is operated in a similar manner. All of the brake mechanism is carried by the brake band 34, and the brake band is pivoted to the fixed pivot member 35. In the case of the internal brake, all parts thereof are secured to the wheel axle knuckles 23, 24, and thus turn with the wheel when the vehicle is steered in other than a straight direction.

The brake valve 9 consists of a cylinder 36, having therein port 37 in communication with air pipe 8, and port 38 in communication with air pipe 12. The valve member 39 is provided with ports 40, 41, 42, and is shown in lap or neutral position in Fig. 8. Upon rotating the valve in counter clockwise direction, the valve port 40 will register with port 37, thereby applying the brake upon two diagonally opposite wheels, and upon rotating the valve farther the valve port will continue to register with port 37, while valve port 42 will be brought opposite to port 38, thereby applying the brakes to all wheels.

Upon rotating valve 39 in the opposite direction, the port 41 may be made to register with port 38, which will apply the brakes to the two diagonally opposite wheels controlled by port 38.

The valve is actuated by the wheel 43 in mesh with a toothed sector 44, on tube 45, which extends within the steering post column 46. The tubular member 45 is actuated by a lever 47 at the top of the steering wheel 48. A graduated sector 49 indicates the lap position, right front and left rear brake position, left front and right rear brake position, and the emergency position whereby brakes are applied to all wheels.

While the invention has been described in language more or less specific as to certain structural features, it is to be understood that the invention is not limited to any specific details, but that the means and construction herein described comprise but one mode of putting the invention into effect, and the invention is therefore claimed broadly and in any of its possible forms and modifications within the scope of the appended claims.

The construction of the elements by which the air pressure is replenished and maintained is not herein detailed: my invention comprising the application of air brakes to a motor vehicle, the system of control therefor, and the means for manually effecting the control.

In Fig. 9 is shown the detail of the clutch, which is automatically released when the brake is applied. The clutch member 50 is normally held in operative engagement with clutch member 51 by spring 52, which encircles the tail-shaft 53. On the forward movement of clutch pedal 54, spring 52 is compressed, and the clutch is released. The foot pedal 54 may be manually operated if desired, but is always automatically released when the brake is applied; being actuated by the piston rod 55, having thereon the pistons 56, 57, arranged to operate in tandem-cylinders 58, 59, respectively. When air pressure enters cylinder 58, from air pipe 12, the piston 56 moves forward, thereby shifting the clutch pedal 54 to release position, and similarly, when air pressure enters cylinder 59, from air pipe 8, the piston 57 is operated to shift the clutch pedal 54 to release position.

From the foregoing it may be seen that I have provided simple and efficient means for automatically releasing the clutch when the brakes are applied.

Air pressure is released from air pipes 8 and 12 through valve 9. Through connecting pipe 65, the interior of valve member 39 is filled with air pressure from tank 13. The valve member 39 is provided with independent ports 60, 61, 62, which have no communication with the interior of the valve or with the air pressure entering the valve through passage 63, in the cylinder casing 36. In lap position, the ports 60, 62, are registered with ports 37 and 38' respectively, while port 61 registers with port 64, through which the pressure exhausts into the air.

What is claimed is:

1. In an air brake system for automobiles having two front and two rear wheels, an air brake for each wheel, an air pressure tank, a distributing valve, pipe conduits between the pressure tank and distributing valve and between the valve and air brakes, and means for manually operating the valve comprising a toothed wheel on the valve stem, a rotating tube within the steering post column, a toothed sector on the bottom of the rotating tube and in mesh with said toothed wheel, a lever on the top of the rotating tube, and a graduating sector on the top of the steering post column whereby said lever may be adjusted for operating the valve.

2. In an air brake system for automobiles, means for braking diagonally opposite wheels simultaneously, means for braking alternately, the other diagonally opposite pair of wheels, means for braking all wheels in unison, and means for disengaging the automobile clutch simultaneously with the application of brakes to any one of the wheels.

3. The combination with an automobile chassis having two front wheels, two rear wheels, a clutch connecting the engine shaft and the driving shaft, and a steering post, of an air brake for each wheel, an air pressure supply tank, a valve at the bottom of the steering post, pipe conduits connecting the distributing valve and the air brakes, a pipe conduit connecting the distributing valve and supply tank, a lever at the top of the steering post to control the valve, a clutch pedal, said clutch pedal being normally in clutch-engaging position, tandem cylinders adjacent to the clutch pedal, pistons working within said cylinders, said cylinders being in communication with said air pipe conduits leading to the brakes, and a piston rod actuated by said pistons, and operating the clutch pedal when the air distributing valve and air brakes are operated.

In testimony whereof I have hereunto affixed my signature this 2nd day of October, 1916.

JUSTO RIVAS OSTOLAZA.

In the presence of—
J. A. BERNAL,
J. B. MILHOUSE.